US011697269B2

(12) United States Patent
Matsumoto et al.

(10) Patent No.: US 11,697,269 B2
(45) Date of Patent: Jul. 11, 2023

(54) TRANSPARENT SUBSTRATE WITH LAMINATED FILM

(71) Applicants: AGC Inc., Tokyo (JP); AGC GLASS EUROPE, Louvain-la-Neuve (BE); AGC FLAT GLASS NORTH AMERICA, INC., Alpharetta, GA (US); AGC VIDROS DO BRASIL LTDA., Sao Paolo (BR)

(72) Inventors: Akiyo Matsumoto, Tokyo (JP); Masanobu Isshiki, Tokyo (JP); Masafumi Akita, Tokyo (JP)

(73) Assignees: AGC INC., Tokyo (JP); AGC GLASS EUROPE, Louvain-la-Neuve (BE); AGC FLAT GLASS NORTH AMERICA, INC., Alpharetta, GA (US); AGC VIDROS DO BRASIL LTDA., Sao Paulo (BR)

( * ) Notice: Subject to any disclaimer, the term of this patent is extended or adjusted under 35 U.S.C. 154(b) by 223 days.

(21) Appl. No.: 16/912,169

(22) Filed: Jun. 25, 2020

(65) Prior Publication Data

US 2020/0324522 A1 Oct. 15, 2020

Related U.S. Application Data

(63) Continuation of application No. PCT/JP2018/047630, filed on Dec. 25, 2018.

(30) Foreign Application Priority Data

Dec. 28, 2017 (JP) ................. 2017-254295

(51) Int. Cl.
*B32B 17/10* (2006.01)

(52) U.S. Cl.
CPC ... *B32B 17/10211* (2013.01); *B32B 2307/204* (2013.01); *B32B 2311/18* (2013.01); *B32B 2311/24* (2013.01)

(58) Field of Classification Search
CPC ......... B32B 17/10211; B32B 2307/204; B32B 2307/412; B32B 2307/416;
(Continued)

(56) References Cited

U.S. PATENT DOCUMENTS 6,881,487 B2 * 4/2005 Lin ..................... C03C 17/3649
428/428

FOREIGN PATENT DOCUMENTS

WO WO-2012/093238 A1 7/2012
WO WO-2016/060082 A1 4/2016
(Continued)

OTHER PUBLICATIONS

International Searching Authority, "International Search Report," issued in connection with International Patent Application No. PCT/JP2018/047630, dated Mar. 12, 2019.
(Continued)

*Primary Examiner* — Humera N. Sheikh
*Assistant Examiner* — Kevin C T Li
(74) *Attorney, Agent, or Firm* — Foley & Lardner LLP (57) ABSTRACT

A transparent substrate with a laminated film, which comprises a transparent substrate and a laminated film formed on at least one surface of the transparent substrate, wherein the laminated film has a first dielectric layer, a crystallinity-improving layer, a functional layer and a second dielectric layer in this order from the transparent substrate side, the crystallinity-improving layer contains $ZrN_x$ (wherein x is higher than 1.2 and at most 2.0), the functional layer contains at least one metal nitride selected from the group consisting of titanium nitride, chromium nitride, niobium
(Continued)

nitride, molybdenum nitride and hafnium nitride, and the concentration of oxygen atoms at a boundary between the crystallinity-improving layer and the functional layer, is at most 20 atom %.

17 Claims, 1 Drawing Sheet

(58) Field of Classification Search
CPC . B32B 2311/18; B32B 2311/24; B32B 27/08; B32B 27/308; B32B 27/365; B32B 27/36; B32B 2255/20; B32B 2419/00; B32B 2255/10; B32B 2605/08; C03C 17/3435
See application file for complete search history.

(56) References Cited

FOREIGN PATENT DOCUMENTS

| WO | WO-2016060082 A1 | * | 4/2016 | ............... B32B 7/02 |
| WO | WO-2016/199676 A1 | | 12/2016 | |
| WO | WO-2016199676 A1 | * | 12/2016 | ............... B32B 9/00 |
| WO | WO-2017/207278 A1 | | 12/2017 | |

OTHER PUBLICATIONS

International Searching Authority, "Written Opinion," issued in connection with International Patent Application No. PCT/JP2018/047630, dated Mar. 12, 2019.

* cited by examiner

Fig. 1

Fig. 2

TRANSPARENT SUBSTRATE WITH LAMINATED FILM

CROSS-REFERENCE TO RELATED PATENT APPLICATIONS

This application is a continuation of PCT Application No. PCT/JP2018/047630, filed on Dec. 25, 2018, which is based upon and claims the benefit of priority from Japanese Patent Application No. 2017-254295 filed on Dec. 28, 2017. The contents of those applications are incorporated herein by reference in their entireties.

TECHNICAL FIELD

The present invention relates to a transparent substrate with a laminated film.

BACKGROUND ART

In tropical areas, for example, in regions of from low latitude to mid-latitude such as Southeast Asia, etc., window glass for buildings is desired to have a high heat shielding property. The window glass is required to have a low thermal emissivity in order to obtain a high heat shielding property. As window glass having a low thermal emissivity, a transparent substrate with a laminated film, heat shielding glass, which comprises a transparent substrate and on the transparent substrate, a laminated film wherein a transparent conductive layer and a nitrogen-containing light-absorbing layer having a thickness of higher than 10 nm are laminated, has been proposed (Patent Document 1).

PRIOR ART DOCUMENT

Patent Document

Patent Document 1: WO2016/060082

DISCLOSURE OF INVENTION

Technical Problem

However, the heat shielding property of the transparent substrate with a laminated film of Patent Document 1 is insufficient, since the nitrogen-containing light-absorbing layer comprising titanium nitride, formed on the surface of the transparent conductive layer of tin doped indium oxide (ITO) has a relatively high resistance, such being problematic. A transparent substrate with a laminated film which has a nitrogen-containing light-absorbing layer containing chromium nitride, niobium nitride, molybdenum nitride or hafnium nitride which has an NaCl type crystal structure similarly to titanium nitride and a lattice constant of the crystalline structure of at most 4.55 Å, has the same problem.

The present invention provides a transparent substrate with a laminated film which has a sufficiently high heat shielding property, even though it has a functional layer containing at least one metal nitride selected from the group consisting of titanium nitride, chromium nitride, niobium nitride, molybdenum nitride and hafnium nitride.

Solution to Problem

The present invention has the following features.
<1> A transparent substrate with a laminated film, which comprises a transparent substrate and a laminated film formed on at least one surface of the transparent substrate, wherein the laminated film has a first dielectric layer, a crystallinity-improving layer, a functional layer and a second dielectric layer in this order from the transparent substrate side, the crystallinity-improving layer contains $ZrN_x$ (wherein x is higher than 1.2 and at most 2.0), the functional layer contains at least one metal nitride selected from the group consisting of titanium nitride, chromium nitride, niobium nitride, molybdenum nitride and hafnium nitride, and the concentration of oxygen atoms at a boundary between the crystallinity-improving layer and the functional layer, is at most 20 atom %.
<2> The transparent substrate with a laminated film according to the above (1), wherein the ratio of integrated intensity of a peak of the (111) plane to integrated intensity of a peak of the (200) plane in an X-ray diffraction pattern of the metal nitride contained in the functional layer is higher than 2.5.
<3> The transparent substrate with a laminated film according to the above (1) or (2), wherein the functional layer has an extinction coefficient of higher than 2.8 at a wavelength of 1,500 nm.
<4> The transparent substrate with a laminated film according to any one of the above (1) to (3), wherein the first dielectric layer has a thickness of from 1.5 to 200 nm, the crystallinity-improving layer has a thickness of from 3 to 30 nm, the functional layer has a thickness of from 3 to 60 nm, and the second dielectric layer has a thickness of from 1.5 to 200 nm.
<5> The transparent substrate with a laminated film according to any one of the above (1) to (4), wherein the transparent substrate is a glass plate.
<6> The transparent substrate with a laminated film according to any one of the above (1) to (5), which has at least two laminated films on one surface of the transparent substrate.
<7> The transparent substrate with a laminated film according to any one of the above (1) to (6), wherein the first dielectric layer contains silicon nitride doped with aluminum.
<8> The transparent substrate with a laminated film according to any one of the above (1) to (7), wherein the functional layer contains either one or both of titanium nitride and chromium nitride.
<9> The transparent substrate with a laminated film according to any one of the above (1) to (8), wherein the ratio of the thickness of the functional layer to the thickness of the crystallinity-improving layer is from 5 to 10.
<10> The transparent substrate with a laminated film according to any one of the above (1) to (9), which has a top layer containing at least one compound selected from the group consisting of silicon dioxide, titanium nitride and carbon, on a surface of the laminated film.
<11> A method for producing the transparent substrate with a laminated film as defined in any one of the above (1) to (10), which comprises forming the first dielectric layer, the crystallinity-improving layer, the functional layer and the second dielectric layer in this order on a surface of the transparent substrate.
<12> The method for producing the transparent substrate with a laminated film according to the above (11), which forms the first dielectric layer, the crystallinity-improving layer, the functional layer and the second dielectric layer by a sputtering method.

<13> The method for producing the transparent substrate with a laminated film according to the above (11) or (12), wherein after forming the layers by the sputtering method, heat treatment is carried out at from 400 to 700° C. for from 2 to 60 minutes.

<14> A laminated glass comprising the transparent substrate with a laminated film as defined in any one of the above (1) to (10).

<15> A double glazing glass comprising the transparent substrate with a laminated film as defined in any one of the above (1) to (10).

<16> A window glass comprising the transparent substrate with a laminated film as defined in any one of the above (1) to (10), wherein the transparent substrate is a single plate.

Advantageous Effects of Invention

Although the transparent substrate with a laminated film of the present invention has a functional layer containing at least one metal nitride selected from the group consisting of titanium nitride, chromium nitride, niobium nitride, molybdenum nitride and hafnium nitride, the crystallinity of the metal nitride contained in the functional layer is improved, and the resistance of the functional layer is low. As a result, the conductivity of the functional layer is high, and the heat shielding property of the transparent substrate with a laminated film is sufficiently high.

DESCRIPTION OF EMBODIMENTS

The following definitions of terms apply throughout this specification including Claims.

"Transparent" means being capable of transmitting light.

"Boundary between the crystallinity-improving layer and the functional layer" is defined as described below. In a case where a functional layer is formed on a surface of a crystallinity-improving layer, atoms constituting the crystallinity-improving layer and atoms constituting the functional layer are mixed with one another, whereby the boundary between the crystallinity-improving layer and the functional layer has a certain width in the thickness direction. Thus, the concentration of atoms in the thickness direction from a surface of the laminated film to an interface between the laminated film and the transparent substrate is analyzed by alternately repeating etching by ion sputtering and X-ray photoelectron spectroscopy (XPS) measurement, and in an obtained graph of the sputtering time and the concentration of atoms, a range of sputtering time where both metal atoms contained in the crystallinity-improving layer and metal atoms contained in the functional layer are detected (provided that a part where either one or both of metal atoms are detected as noise is excluded), is taken as the boundary between the crystallinity-improving layer and the functional layer "Concentration of oxygen atoms at the boundary between the crystallinity-improving layer and the functional layer" is obtained as the maximum value of the concentration of oxygen atoms in the range of sputtering time where both metal atoms contained in the crystallinity-improving layer and metal atoms contained in the functional layer are detected in the above graph of the sputtering time and the concentration of atoms.

"X-ray diffraction pattern of the metal nitride contained in the functional layer" is measured by means of an X-ray diffraction (XRD) device by the method and under conditions described in Examples.

The thickness of the transparent substrate and the thickness of each layer constituting the laminated film are geometric thickness.

The expression "to" showing a numerical range is used to include the numerical values before and after it as the lower limit value and the upper limit value.

A value of "pressure" is "absolute pressure" unless otherwise specified.

Figure 1:
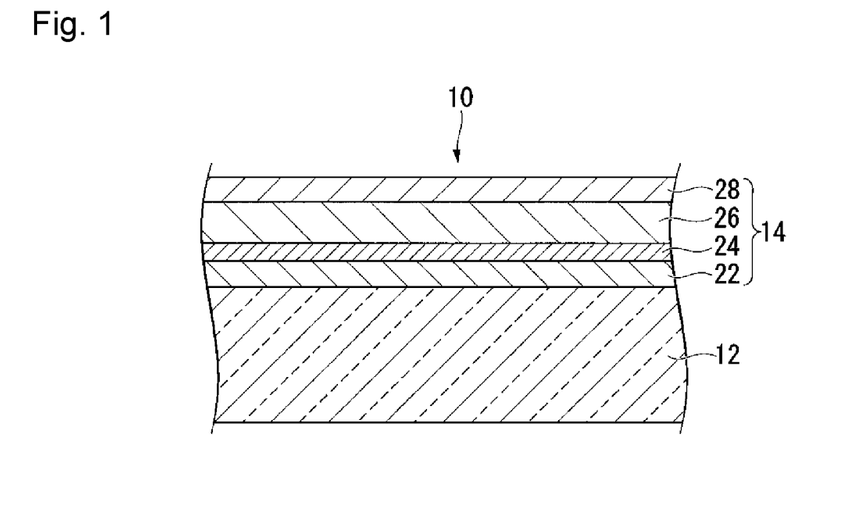
FIG. 1 is a cross-sectional view illustrating one example of the transparent substrate with a laminated film of the present invention.
Figure 2:
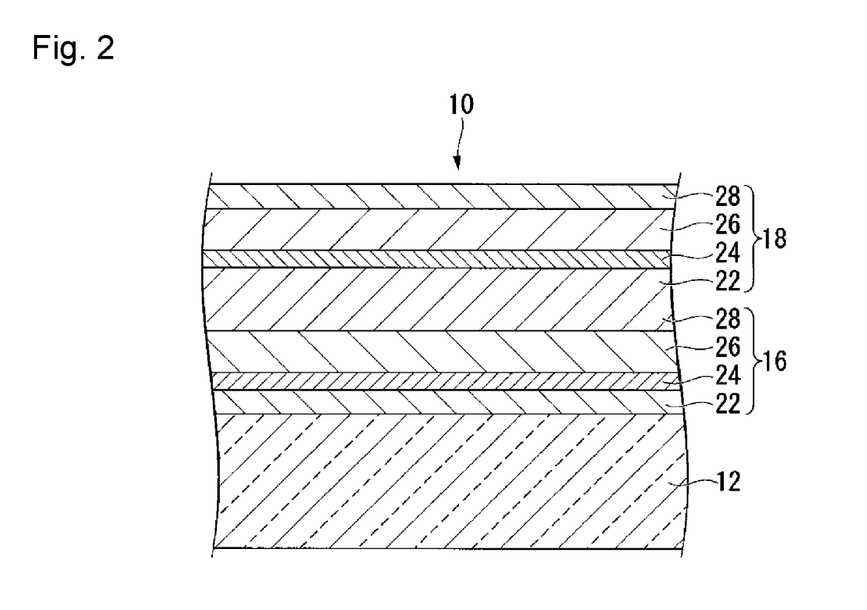
FIG. 2 is a cross-sectional view illustrating another example of the transparent substrate with a laminated film of the present invention.

FIG. 1 and FIG. 2 are schematic views respectively, and their size ratios are different from actual size ratios for explanatory convenience.

(Transparent Substrate with Laminated Film)

FIG. 1 is a cross-sectional view illustrating one example of the transparent substrate with a laminated film of the present invention.

A transparent substrate with a laminated film 10 has a transparent substrate 12 and a laminated film 14 formed on one surface of the transparent substrate 12.

The laminated film 14 has a first dielectric layer 22, a crystallinity-improving layer 24, a functional layer 26 and a second dielectric layer 28 in this order from the transparent substrate 12 side.

FIG. 2 is a cross-sectional view illustrating another example of the transparent substrate with a laminated film of the present invention.

A transparent substrate with a laminated film 10 has a transparent substrate 12, a first laminated film 16 formed on one surface of the transparent substrate 12 and a second laminated film 18 formed thereon.

The first laminated film 16 has a first dielectric layer 22, a crystallinity-improving layer 24, a functional layer 26 and a second dielectric layer 28 which also functions as a first dielectric layer 22 for a second laminated film 18 in this order from the transparent substrate 12 side.

The second laminated film 18 has the first dielectric layer 22 which also functions as the second dielectric layer 28 for the first laminated film 16, a crystallinity-improving layer 24, a functional layer 26 and a second dielectric layer 28 in this order from the transparent substrate 12 side.

As the transparent substrate, a glass plate, a resin substrate, etc. may be mentioned, and the glass plate is preferred from the viewpoint of the weather resistance, the light resistance, the heat resistance, etc.

As a material of the glass plate, soda lime glass, aluminosilicate glass, alkali-free glass, borosilicate glass, etc. may be mentioned, and soda lime glass is preferred.

As a material of the resin substrate, a polycarbonate, an acrylic resin, a polyester, etc. may be mentioned.

The thickness of the transparent substrate is appropriately determined depending on applications of the transparent substrate with a laminated film. In a case the transparent substrate with a laminated film is used as a window glass, the thickness of the transparent substrate is preferably from 0.5 to 12 mm.

The laminated film has a first dielectric layer, a crystallinity-improving layer, a functional layer and a second dielectric layer in this order from the transparent substrate side.

The laminated film may have a sacrificial layer between the first dielectric layer and the crystallinity-improving layer as a case requires and may have a sacrificial layer between the functional layer and the second dielectric layer. These sacrificial layers are ones for suppressing diffusion of nitrogen from the first dielectric layer into the crystallinity-improving layer or diffusion of nitrogen from the second dielectric layer into the functional layer at the time of heat treatment, and preferably ones comprising silicon, aluminum, titanium, chromium, niobium, molybdenum, hafnium or zirconium or a combination thereof.

Further, the laminated film may have the after-mentioned top layer for protecting the laminated film on a surface of the second dielectric layer which is farthest from the transparent substrate.

The laminated film is formed on at least one surface of the transparent substrate. The laminated films may be formed on both surfaces of the transparent substrate.

It is preferred to form at least two laminated films, since the heat shielding property of the transparent substrate with a laminated film is further improved, and it is more preferred to overlay plural laminated films. In a case where plural laminated films are overlaid, and the second dielectric layer in the laminated film at the transparent substrate side and the first dielectric layer in the laminated film adjacent thereto are made of the same material, as these dielectric layers, one dielectric layer having functions of both of the dielectric layers respectively may be formed.

In a case where plural laminated films are overlaid, at least one laminated film has to have a functional layer containing at least one metal nitride selected from the group consisting of titanium nitride, chromium nitride, niobium nitride, molybdenum nitride and hafnium nitride, and the other laminated films may have a functional layer containing none of titanium nitride, chromium nitride, niobium nitride, molybdenum nitride and hafnium nitride (such as a functional layer containing zirconium nitride).

As the material of the first dielectric layer, silicon nitride, aluminum nitride, etc. may be mentioned. Silicon nitride may be one doped with boron, aluminum, titanium, nickel, zinc, molybdenum, tin, tungsten, zirconium or niobium. Aluminum nitride may be one doped with boron, silicon, titanium, nickel, zinc, molybdenum, tin, tungsten, zirconium or niobium.

The material of the first dielectric layer preferably contains silicon nitride doped with aluminum ($Si_{1-\alpha}N_y \cdot Al_\alpha$ ($\alpha$ is at least 0.03 and at most 0.50, and y is at least 1.0 and at most 2.0)) from the viewpoint of the improvement of the moisture resistance.

The first dielectric layer may contain impurities (such as carbon atoms or oxygen atoms) unavoidably incorporated at the time of the film formation. The first dielectric layer may be a monolayer or a layer having at least two different layers in combination.

The first dielectric layer preferably has a thickness of from 1.5 to 200 nm. When the first dielectric layer has a thickness of at least 1.5 nm, the functional layer can be protected from deterioration due to oxygen or moisture. When the first dielectric layer has a thickness of at most 200 nm, productivity will be good.

The crystallinity-improving layer improves the crystallinity of the specific metal nitride contained in the functional layer which is directly formed thereon. The crystallinity-improving layer contains $ZrN_x$ (x is higher than 1.2 and at most 2.0). In the crystallinity-improving layer, $ZrN_x$ is preferably present in a part which is in contact with the functional layer.

The value of x in $ZrN_x$ is higher than 1.2 and at most 2.0. When x is higher than 1.2, the effect to improve the crystallinity of the specific metal nitride contained in the functional layer is obtained. x is preferably at least 1.28, more preferably at least 1.35. The upper limit value of x is 2 which is the theoretical value on the chemical composition.

The value of x can be controlled by controlling film formation conditions (such as the temperature of the transparent substrate, the pressure at the time of the film formation, the composition of introduced gas, the power of electric power source at the time of the film formation, the composition of a target or the temperature of post heat treatment).

The crystallinity-improving layer may contain impurities (such as carbon atoms, oxygen atoms or other metal atoms) unavoidably introduced at the time of the film formation.

Further, if the concentration of oxygen in the surface of the crystallinity-improving layer increases, the effect to improve the crystallinity of the specific metal nitride contained in the functional layer formed directly thereon deteriorates. If the concentration of oxygen in the surface of the crystallinity-improving layer increases, the bond between the metal nitride contained in the functional layer formed directly thereon and ZrNx contained in the crystallinity-improving layer becomes weak, whereby the effect of the crystallinity-improving layer on the crystallinity of the metal nitride becomes small. The present inventors have found that when the concentration of oxygen in the surface of the crystallinity-improving layer is at most 20 atom %, the bond between the metal nitride and ZrNx is strong, whereby the crystallinity of the metal nitride is strongly influenced by the crystallinity-improving layer and is thereby changed.

Further, heretofore, it has not been known that although the lattice constant of the crystallinity-improving layer is different from the lattice constant of the metal nitride layer, the crystallinity of the metal nitride layer is improved. The concentration of oxygen atoms at the boundary between the crystallinity-improving layer and the functional layer is at most 20 atom %, preferably at most 15 atom %, more preferably at most 10 atom %. The lower the concentration of oxygen atoms at the boundary between the crystallinity-improving layer and the functional layer is, the more preferred, and its lower limit value is 0 atom %.

The crystallinity-improving layer preferably has a thickness of from 3 to 30 nm, more preferably from 4.5 to 25 nm. When the thickness is at least the lower limit value of the above range, the effect to improve the crystallinity of the specific metal nitride contained in the functional layer can be sufficiently obtained. When the thickness is at most the upper limit value of the above range, the surface irregularities of the crystallinity-improving layer are small, whereby the crystal growth in the functional layer is promoted, and the effect to improve the crystallinity can be sufficiently obtained.

The functional layer contains at least one metal nitride selected from the group consisting of titanium nitride, chromium nitride, niobium nitride, molybdenum nitride and hafnium nitride, which has a heat ray reflection function (hereinafter referred to also as "specific metal nitride"). The functional layer preferably contains either one or both of titanium nitride and chromium nitride. The functional layer particularly preferably contains titanium nitride with a view to having an excellent heat ray reflection function.

The functional layer may contain impurities (such as carbon atom, oxygen atoms or other metal atoms) unavoidably introduced at the time of the film formation.

The functional layer is formed directly on and in contact with the crystallinity-improving layer.

It is known that by forming a functional layer containing $ZrN_x$ ($0.9<x<1.0$) directly on a crystallinity-improving layer containing $ZrN_x$ ($x>1.2$), the crystallinity of $ZrN_x$ ($0.9<x<1.0$) contained in the functional layer is improved, because the crystal structure and the constituent elements of $ZrN_x$ ($x>1.2$) and $ZrN_x$ ($0.9<x<1.0$) are substantially the same.

On the other hand, based on technical common knowledges, it is difficult to expect that the crystallinity of a metal nitride other than zirconium nitride contained in a functional layer is improved, although the functional layer containing a metal nitride other than zirconium nitride is formed directly on a crystallinity-improving layer containing $ZrN_x$ ($x>1.2$), since the lattice constant and the constituent elements of titanium nitride, chromium nitride, niobium nitride, molybdenum nitride and hafnium nitride which have an NaCl type crystal structure and a lattice constant of the crystal structure of at most 4.55 Å are different from the lattice constant and the constituent elements of zirconium nitride (NaCl type, lattice constant: 4.58 Å).

However, surprisingly, the present inventors have found that the crystallinity of a metal nitride other than zirconium nitride contained in the functional layer is improved, although a functional layer containing at least one metal nitride selected from the group consisting of titanium nitride, chromium nitride, niobium nitride, molybdenum nitride and hafnium nitride, is formed directly on the crystallinity-improving layer containing $ZrN_x$ ($x>1.2$).

The degree of the crystallinity of the specific metal nitride contained in the functional layer can be measured by the size of a peak of the (111) plane in an X-ray diffraction pattern of a lattice plane in parallel with the surface of the functional layer. That is, the ratio ($I_{111}/I_{200}$) of the integrated intensity $I_{111}$ of a peak of the (111) plane to the integrated intensity $I_{200}$ of a peak of the (200) plane in an X-ray diffraction pattern of the metal nitride contained in the functional layer is preferably higher than 2.5, more preferably at least 3.4, further preferably at least 5.5. When $I_{111}/I_{200}$ is high, the specific metal nitride contained in the functional layer is uniformly oriented, whereby the crystallinity is sufficiently high, and the resistance of the functional layer is sufficiently low. As a result, the functional layer has a sufficiently high conductivity, and the transparent substrate with a laminated film thereby has a higher heat shielding property. The higher the $I_{111}/I_{200}$ is, the more preferred, and the upper limit value is not particularly limited. For example, if the orientation of the (111) plane is sufficiently uniform, the intensity of a peak of the (200) plane is unmeasurably low, and thereby $I_{111}/I_{200}$ becomes infinite. Further, the effect of the crystallinity-improving layer to improve $I_{111}/I_{200}$ of the functional layer is effective immediately after forming the laminated film and also after heat treatment subsequent to the formation of the laminated film.

The extinction coefficient of the functional layer at a wavelength of 1,500 nm is preferably higher than 2.8, more preferably at least 4.1, further preferably at least 5.9. When the extinction coefficient is high, the functional layer has a sufficiently high conductivity, and the transparent substrate with a laminated film has a higher heat shielding property. The higher the extinction coefficient is, the more preferred, and the upper limit value is usually 10.0.

The thickness of the functional layer is preferably from 3 to 60 nm, more preferably from 10 to 40 nm. When the thickness is at least the lower limit value of the above range, the transparent substrate with a laminated film has a higher heat shielding property. When the thickness is at most the upper limit value of the above range, the transparent substrate with a laminated film has an appropriate visible light permeability.

The ratio of the thickness of the functional layer to the thickness of the crystallinity-improving layer is preferably from 5 to 10. When the ratio of the thickness is from 5 to 10, the effect to improve the crystallinity of the functional layer by the crystallinity-improving layer can be sufficiently obtained, whereby the transparent substrate with a laminated film has a higher heat shielding property. The ratio of the thickness is more preferably from 5 to 9, particularly preferably from 5 to 8.

The material of the second dielectric layer may be the same as the material of the first dielectric layer, and a preferred embodiment is also the same.

The second dielectric layer may contain impurities (such as carbon atoms or oxygen atoms) unavoidably introduced at the time of the film formation. The second dielectric layer may be a monolayer or a layer having at least two different type layers in combination.

The second dielectric layer preferably has a thickness of from 1.5 to 200 nm. When the thickness is at least 1.5 nm, the functional layer can be protected from deterioration due to oxygen or moisture. When the thickness is at most 200 nm, good productivity will be obtained.

Either one or both of the material and the thickness of the second dielectric layer may be the same as or different from the first dielectric layer.

A top layer to be formed as a case requires protects the laminated film. In a case where the second dielectric layer also has a function as a protective layer, it is not necessary to form the top layer.

As the material of the top layer, silicon dioxide, titanium nitride, carbon, etc. may be mentioned.

The thickness of the top layer is preferably from 1 to 10 nm.

The transparent substrate with a laminated film of the present invention is produced by sequentially forming a first dielectric layer, a crystallinity-improving layer, a functional layer and a second dielectric layer on a surface of a transparent substrate.

The film formation method may, for example be a physical vapor deposition method (vacuum deposition method, ion plating method or sputtering method), a chemical vapor deposition method (heat CVD method, plasma CVD method or photo CVD method) or an ion beam sputtering method. The sputtering method is preferred from the viewpoint of the uniformity of the thickness and excellent productivity.

The transparent substrate with a laminated film of the present invention may be subjected to heat treatment after forming a laminated film on a transparent substrate. By carrying out the heat treatment, the effect to improve the crystallinity of the functional layer and to increase the conductivity can be obtained. The heat treatment may, for example, be carried out by maintaining the laminated film under air atmosphere at preferably from 400 to 700° C., more preferably from 500 to 700° C. for preferably from 2 minutes to 1 hour, more preferably from 5 minutes to 1 hour.

The transparent substrate with a laminated film of the present invention can be used as a heat shielding glass for a window glass for buildings or a window glass for automobiles.

The transparent substrate with a laminated film of the present invention may be used as a single plate as it is, as a laminated glass or as a double glazing.

The laminated glass has a first transparent substrate, a second transparent substrate and an interlayer formed between these transparent substrates. The transparent substrate with a laminated film of the present invention may be used as either one or both of the first transparent substrate and the second transparent substrate.

The double glazing has a first transparent substrate, a second transparent substrate and a frame shape spacer formed so as to intermediate at peripheral parts of the first transparent substrate and the second transparent substrate so that space can be formed between the transparent substrates. The transparent substrate with a laminated film of the present invention may be used as either one or both of the first transparent substrate and the second transparent substrate.

The above-described transparent substrate with a laminated film of the present invention has the crystallinity-improving layer containing $ZrN_x$ (x is higher than 1.2 and at most 2.0) beneath the functional layer and has at most 20 atom % of the concentration of oxygen atoms at the boundary between the crystallinity-improving layer and the functional layer. Thus, although the functional layer formed directly on to be in contact with the crystallinity-improving layer contains at least one metal nitride selected from the group consisting of titanium nitride, chromium nitride, niobium nitride, molybdenum nitride and hafnium nitride, the crystallinity of the metal nitride contained in the functional layer is improved, and the resistance of the functional layer is low. As a result, the functional layer has a high conductivity, and the transparent substrate with a laminated film has a sufficiently high heat shielding property.

EXAMPLES

Now, the present invention will be described with reference to Examples, however, the present invention is by no means restricted thereto.

Ex. 1 to 10 and 14 are Examples of the present invention, and Ex. 11 to 13 and 15 are Comparative Examples.

(Thickness of Each Layer)

The thickness of each layer in the laminated film was determined from solutions of a complex refractive index and a film thickness which satisfy all of spectral ellipsometer (measured at an incident angle of 50°, 60° and 70° by means of "M-2000" manufactured by J.A. Woollam Co., Inc.), transmission spectrum (measured in a wavelength region of from 250 nm to 2,500 nm by means of "U-4100", manufactured by Hitachi, Ltd.), film surface reflection spectrum (measured at an incident angle of 5° in a wavelength region of from 250 nm to 2,500 nm by means of "U-4100", manufactured by Hitachi, Ltd.) and glass surface reflection spectrum (measured at an incident angle of 5° in a wavelength region of from 250 nm to 2,500 nm by means of "U-4100", manufactured by Hitachi, Ltd.).

(Rbs Measurement)

The element ratio of N to Zr in zirconium nitride or zirconium oxynitride constituting the crystallinity-improving layer, namely the value of x in $ZrN_x$ or $ZrN_xO_z$, was obtained by Rutherford Backscattering Spectrometry (RBS).

(XPS Measurement)

The concentration of atoms was analyzed in the thickness direction from a surface of the laminated film to an interface between the laminated film and the transparent substrate by means of a scanning X-ray photoelectron spectrometer ("PHI 5000 Versa Probe", manufactured by ULVAC-PHI, INCORPORATED) with a beam diameter of 100 μm. Here, argon gas was used as etching gas, the gas pressure was $1.5\times10^{-2}$ Pa, the accelerating voltage was 1 kV, and the ion beam diameter was 1×1 mm. The concentration of oxygen atoms at the boundary between the crystallinity-improving layer and the functional layer was obtained from results of the measurement.

In a case where two or more laminated films were formed, the concentration of oxygen atoms at the boundary between the crystallinity-improving layer and the functional layer in each laminated film was measured, and the minimum value was selected.

(XRD Measurement)

The transparent substrate with a laminated film was cut into pieces having a size of 2.5 cm×2.5 cm which were used as samples for XRD measurement.

A desktop X-ray diffraction apparatus ("MiniFlex II", manufactured by Rigaku Corporation) was used for XRD measurement. A sample was set so that diffraction in a perpendicular direction to the substrate would be evaluated, and 2θ/θ scanning was carried out at a divergent slit of 1.25°, a scattering slit of 1.25° and a receiving slit of 0.3 mm in a range of 2θ of from 30° to 60°.

After background correction, an integrated intensity $I_{111}$ of a peak (2θ=32.9 to 37.5 deg.) resulting from the (111) plane and an integrated intensity $I_{200}$ of a peak (2θ=38.4 to 43.7 deg.) resulting from the (200) plane in an X-ray diffraction pattern of the metal nitride (titanium nitride, chromium nitride, niobium nitride, molybdenum nitride or hafnium nitride) contained in the functional layer were obtained, and the ratio of integrated intensity ($I_{111}/I_{200}$) was calculated.

In a case where two or more functional layers were formed, $I_{111}/I_{200}$ of each functional layer was obtained, and the highest value was selected. In a case where two or more of the same functional layers were formed, or peaks were so close that they could not be separated, the ratio ($I_{111}/I_{200}$) of integrated intensity obtained as a value of the sum of the plural layers was selected.

(Sheet Resistance)

A sheet resistance of the laminated film was measured by means of a non-contact sheet resistance meter ("717 Conductance Monitor", manufactured by Delcom Instruments, Inc.).

(Extinction Coefficient)

An extinction coefficient of the functional layer at a wavelength of 1,500 nm was obtained as follows.

With respect to the transparent substrate with a laminated film, a spectrum was measured by means of a spectrophotometer ("U-4100", manufactured by Hitachi, Ltd.). Further, the information of polarization was measured by means of a spectroellipsometer ("M-2000", manufactured by J.A. Woollam Co., Inc.). The obtained transmission spectrum, the reflection spectra (film surface and glass surface) and the information of polarization were subjected to optical model fitting to determine an extinction coefficient.

(Ex. 1)

A soda lime glass plate of 100 mm (length)×100 mm (width)×3 mm (thickness) was prepared as the transparent substrate.

A laminated film having the layer structure shown in Table 1 was formed on one surface of the transparent substrate, and then, heat treatment was carried out at 680° C. for 20 minutes under air atmosphere to obtain a transparent substrate with a laminated film. Respective layers in the laminated film were formed by a sputtering method.

For forming a first dielectric layer ($Si_{1-\alpha}N_y \cdot Al_\alpha$), an Si—Al (10 mass %) target was used, and a mixed gas of argon gas and nitrogen gas (argon gas:nitrogen gas=3:2

(Sccm)) was used as electric discharge gas. The pressure for the film formation was 0.4 Pa.

For forming a crystallinity-improving layer ($ZrN_x$), a Zr target was used, and nitrogen gas was used as electric discharge gas. The pressure for the film formation was 0.4 Pa.

For forming a functional layer (TiN), a Ti target was used, and a mixed gas of argon gas and nitrogen gas (argon gas:nitrogen gas=5.7:1 (Sccm)) was used as electric discharge gas. The pressure for the film formation was 0.3 Pa.

For forming a second dielectric layer ($Si_{1-\alpha}N_y \cdot Al_\alpha$), an Si—Al (10 mass %) target was used, and a mixed gas of argon gas and nitrogen gas (argon gas:nitrogen gas=3:2 (Sccm)) was used as electric discharge gas. The pressure for the film formation was 0.4 Pa.

(Ex. 2)

For forming a crystallinity-improving layer ($ZrN_x$), a Zr target was used, and a mixed gas of nitrogen gas and oxygen gas (nitrogen gas:oxygen gas=27:1 (Sccm)) was used as electric discharge gas. The pressure for the film formation was 0.4 Pa.

The thicknesses of the crystallinity-improving layer and the functional layer were controlled so as to be thickness shown in Table 1 by changing a rate of conveying the substrate. The others were carried out in the same manner as in Ex. 1 to form a laminated film having the layer structure shown in Table 1 on one surface of the transparent substrate, and a transparent substrate with a laminated film was thereby obtained.

(Ex. 3)

For forming a crystallinity-improving layer ($ZrN_x$), a Zr target was used, and a mixed gas of nitrogen gas and oxygen gas (nitrogen gas:oxygen gas=40:1 (Sccm)) was used as electric discharge gas. The pressure for the film formation was 0.4 Pa.

For forming a functional layer (CrN), a Cr target was used, and a mixed gas of argon gas and nitrogen gas (argon gas:nitrogen gas=3:2 (Sccm)) was used as electric discharge gas. The pressure for the film formation was 0.4 Pa.

The thicknesses of the crystallinity-improving layer and the functional layer were controlled so as to be thickness shown in Table 1 by changing a rate of conveying the substrate. The others were carried out in the same manner as in Ex. 1 to form a laminated film having the layer structure shown in Table 1 on one surface of the transparent substrate, and a transparent substrate with a laminated film was thereby obtained.

(Ex. 4)

A soda lime glass plate of 100 mm×100 mm×6 mm in thickness was prepared as the transparent substrate.

The thicknesses of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 5)

A soda lime glass plate of 100 mm×100 mm×6 mm in thickness was prepared as the transparent substrate.

A Zr target was used, and a mixed gas of argon gas and oxygen gas (argon gas:oxygen gas=4.9:1 (Sccm)) was used as electric discharge gas for forming a functional layer (ZrN) of a first laminated film. The pressure for the film formation was 0.3 Pa.

A functional layer (CrN) of a second laminated film was formed in the same manner as in Ex. 3.

The thicknesses of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 6)

A soda lime glass plate of 100 mm×100 mm×6 mm in thickness was prepared as the transparent substrate.

A functional layer (ZrN) of a first laminated film was formed in the same manner as in Ex. 5.

The thicknesses of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 7)

A soda lime glass plate of 100 mm×100 mm×6 mm in thickness was prepared as the transparent substrate.

A Hf target was used, and a mixed gas of argon gas and oxygen gas (argon gas:oxygen gas=4.6:1 (Sccm)) was used as electric discharge gas for forming a functional layer (HfN) of a first laminated film. The pressure for the film formation was 0.3 Pa.

The thickness of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 8)

A soda lime glass plate of 100 mm×100 mm×6 mm in thickness was prepared as the transparent substrate.

The crystallinity-improving layer of a second laminated film was not formed.

A functional layer (ZrN) of a second laminated film was formed in the same manner as in Ex 5.

The thicknesses of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 9)

A soda lime glass plate of 100 mm×100 mm×8 mm in thickness was prepared as the transparent substrate.

A functional layer (ZrN) of a second laminated film was formed in the same manner as in Ex 5.

The thicknesses of the dielectric layer, the crystallinity-improving layer and the functional layer were controlled so as to be thickness shown in Table 1 by changing a rate of conveying the substrate. The others were carried out in the same manner as in Ex. 1 to form a first laminated film and a second laminated film having the layer structure shown in Table 1 on one surface of the transparent substrate, and a transparent substrate with a laminated film was thereby obtained.

(Ex. 10)

The thicknesses of the dielectric layer, the crystallinity-improving layer and the functional layer were controlled so as to be thickness shown in Table 1 by changing a rate of conveying the substrate. The others were carried out in the same manner as in Ex. 9 to form a first laminated film and a second laminated film having the layer structure shown in Table 1 on one surface of a transparent substrate, and a transparent substrate with a laminated film was thereby obtained.

(Ex. 11)

The crystallinity-improving layer was not formed. A functional layer (CrN) was formed in the same manner as in Ex. 3.

The others were carried out in the same manner as in Ex. 1 to form a laminated film having the layer structure shown in Table 1 on one surface of a transparent substrate, and a transparent substrate with a laminated film was thereby obtained.

(Ex. 12)

The crystallinity-improving layer was not formed.

The others were carried out in the same manner as in Ex. 1 to form a laminated film having the layer structure shown in Table 1 on one surface of a transparent substrate, and a transparent substrate with a laminated film was thereby obtained.

(Ex. 13)

A Zr target was used, and a mixed gas of nitrogen gas and oxygen gas (nitrogen gas:oxygen gas=13:1 (Sccm)) was used as electric discharge gas for forming a crystallinity-improving layer ($ZrN_xO_z$). The pressure for the film formation was 0.4 Pa.

A functional layer (CrN) was formed in the same manner as in Ex. 3.

The others were carried out in the same manner as in Ex. 1 to form a laminated film having the layer structure shown in Table 1 on one surface of a transparent substrate, and a transparent substrate with a laminated film was thereby obtained.

(Ex. 14)

A transparent substrate with a laminated film was obtained in the same manner as in Ex. 1, except that the heat treatment at 680° C. for 20 minutes was not carried out.

(Ex. 15)

A transparent substrate with a laminated film was obtained in the same manner as in Ex. 12, except that the heat treatment at 680° C. for 20 minutes was not carried out.

TABLE 1

| | | First laminated film | | | | | |
|---|---|---|---|---|---|---|---|
| | Thickness of | First dielectric layer | | Crystallinity-improving layer | | Functional layer | |
| Ex. | glass plate [mm] | Material | Thickness [nm] | Material | Thickness [nm] | Material | Thickness [nm] |
| 1 | 3 | $Si_{1-\alpha}N_y \cdot Al_\alpha$ | 15 | $ZrN_x$ | 10 | TiN | 20 |
| 2 | 3 | $Si_{1-\alpha}N_y \cdot Al_\alpha$ | 15 | $ZrN_x$ | 7 | TiN | 25 |
| 3 | 3 | $Si_{1-\alpha}N_y \cdot Al_\alpha$ | 15 | $ZrN_x$ | 3 | CrN | 25 |
| 4 | 6 | $Si_{1-\alpha}N_y \cdot Al_\alpha$ | 8 | $ZrN_x$ | 13 | TiN | 16 |
| 5 | 6 | $Si_{1-\alpha}N_y \cdot Al_\alpha$ | 15 | $ZrN_x$ | 10 | ZrN | 20 |
| 6 | 6 | $Si_{1-\alpha}N_y \cdot Al_\alpha$ | 35 | $ZrN_x$ | 4 | ZrN | 27 |
| 7 | 6 | $Si_{1-\alpha}N_y \cdot Al_\alpha$ | 7 | $ZrN_x$ | 8 | HfN | 21 |
| 8 | 6 | $Si_{1-\alpha}N_y \cdot Al_\alpha$ | 30 | $ZrN_x$ | 10 | TiN | 35 |
| 9 | 8 | $Si_{1-\alpha}N_y \cdot Al_\alpha$ | 2.5 | $ZrN_x$ | 4.5 | TiN | 9.5 |
| 10 | 8 | $Si_{1-\alpha}N_y \cdot Al_\alpha$ | 18 | $ZrN_x$ | 13 | TiN | 17 |
| 11 | 3 | $Si_{1-\alpha}N_y \cdot Al_\alpha$ | 15 | — | — | CrN | 25 |
| 12 | 3 | $Si_{1-\alpha}N_y \cdot Al_\alpha$ | 15 | — | — | TiN | 20 |
| 13 | 3 | $Si_{1-\alpha}N_y \cdot Al_\alpha$ | 15 | $ZrN_xO_z$ | 10 | CrN | 25 |

| | First laminated film | | Second laminated film | | | | | | | |
|---|---|---|---|---|---|---|---|---|---|---|
| | Second dielectric layer | | First dielectric layer | | Crystallinity-improving layer | | Functional layer | | Second dielectric layer | |
| Ex. | Material | Thickness [nm] | Material | Thickness [nm] | Material | Thickness [nm] | Material | Thickness [nm] | Material | Thickness [nm] |
| 1 | $Si_{1-\alpha}N_y \cdot Al_\alpha$ | 15 | — | — | — | — | — | — | — | — |
| 2 | $Si_{1-\alpha}N_y \cdot Al_\alpha$ | 15 | — | — | — | — | — | — | — | — |
| 3 | $Si_{1-\alpha}N_y \cdot Al_\alpha$ | 15 | — | — | — | — | — | — | — | — |
| 4 | | | $Si_{1-\alpha}N_y \cdot Al_\alpha$ | 68 | $ZrN_x$ | 6 | TiN | 27 | $Si_{1-\alpha}N_y \cdot Al_\alpha$ | 31 |
| 5 | | | $Si_{1-\alpha}N_y \cdot Al_\alpha$ | 45 | $ZrN_x$ | 7 | CrN | 25 | $Si_{1-\alpha}N_y \cdot Al_\alpha$ | 30 |
| 6 | | | $Si_{1-\alpha}N_y \cdot Al_\alpha$ | 79 | $ZrN_x$ | 3 | TiN | 21 | $Si_{1-\alpha}N_y \cdot Al_\alpha$ | 35 |
| 7 | | | $Si_{1-\alpha}N_y \cdot Al_\alpha$ | 75 | $ZrN_x$ | 12 | TiN | 22 | $Si_{1-\alpha}N_y \cdot Al_\alpha$ | 39 |
| 8 | | | $Si_{1-\alpha}N_y \cdot Al_\alpha$ | 90 | — | — | ZrN | 15 | $Si_{1-\alpha}N_y \cdot Al_\alpha$ | 45 |
| 9 | | | $Si_{1-\alpha}N_y \cdot Al_\alpha$ | 9 | $ZrN_x$ | 25 | ZrN | 15 | $Si_{1-\alpha}N_y \cdot Al_\alpha$ | 20 |
| 10 | | | $Si_{1-\alpha}N_y \cdot Al_\alpha$ | 79 | $ZrN_x$ | 7.5 | ZrN | 26 | $Si_{1-\alpha}N_y \cdot Al_\alpha$ | 34 |
| 11 | $Si_{1-\alpha}N_y \cdot Al_\alpha$ | 15 | — | — | — | — | — | — | — | — |
| 12 | $Si_{1-\alpha}N_y \cdot Al_\alpha$ | 15 | — | — | — | — | — | — | — | — |
| 13 | $Si_{1-\alpha}N_y \cdot Al_\alpha$ | 15 | — | — | — | — | — | — | — | — |

(Results)

With respect to the transparent substrates with a laminated film of Ex. 1 to Ex. 15, $I_{111}/I_{200}$ of the functional layer was obtained. Further, with respect to the transparent substrates with a laminated film of Ex. 1 to Ex. 13, the value of x in $ZrN_x$ or $ZrN_xO_z$ which constitutes the crystallinity-improving layer and the concentration of oxygen atoms at the boundary between the crystallinity-improving layer and the functional layer were obtained. Further, with respect to the transparent substrates with a laminated film of Ex. 1 to 3 and 11 to 15, the sheet resistance of the laminated film was obtained. Further, with respect to the transparent substrates with a laminated film of Ex. 1 to 3 and 11, the extinction coefficient of the functional layer at a wavelength to 1,500 nm was obtained. Results are shown in Table 2.

has a high sheet resistance as compared with the laminated film having the same functional layer (CrN) in Ex. 3. Accordingly, the heat shielding property is low.

Of the transparent substrate with a laminated film in Ex. 14, since the metal nitride contained in the functional layer has a high crystallinity, the laminated film has a relatively low sheet resistance, and the heat shielding property is sufficiently high, although heat treatment was not carried out.

INDUSTRIAL APPLICABILITY

The transparent substrate with a laminated film of the present invention is useful as heat shielding glass for e.g. window glass for buildings and window glass for automobiles.

TABLE 2

| Ex. | Value of x in $ZrN_x$ or $ZrN_xO_z$ | Concentration of oxygen atoms in boundary between crystallinity-improving layer and functional layer [atom %] | Functional layer in first laminated film $I_{111}/I_{200}$ | Functional layer in second laminated film $I_{111}/I_{200}$ | Sheet resistance of laminated film [Ω] | Extinction coefficient of functional layer at wavelength of 1,500 nm |
|---|---|---|---|---|---|---|
| 1 | 1.63 | 3.2 | 92.0 | — | 39.5 | 7.40 |
| 14 | — | — | 27.5 | — | 44.2 | — |
| 2 | 1.31 | 18.8 | 4.65 | — | 44.8 | 5.98 |
| 3 | 1.35 | 12.5 | 2.8 | — | 400 | 2.55 |
| 4 | 1.61 | 4.8 | 5.77 | — | — | — |
| 5 | 1.61 | 4.2 | (ZrN) | 5.52 | — | — |
| 6 | 1.61 | 4.0 | (ZrN) | 3.47 | — | — |
| 7 | 1.61 | 4.0 | 11.9 | 21.4 | — | — |
| 8 | 1.61 | 4.0 | 16.7 | (ZrN) | — | — |
| 9 | 1.59 | 5.2 | 5.8 | (ZrN) | — | — |
| 10 | 1.59 | 5.2 | 5.8 | (ZrN) | — | — |
| 11 | — | — | 1.27 | — | 454 | 1.91 |
| 12 | — | — | 1.76 | — | 58.5 | — |
| 15 | — | — | 0 | — | 66.6 | — |
| 13 | 1.14 | 24.9 | 0.97 | — | 465 | — |

Of the transparent substrates with a laminated film in Ex. 1 to 3, since the metal nitride contained in the functional layer has a high crystallinity, the laminated film has a relatively low sheet resistance, and the functional layer has a high extinction coefficient at a wavelength of 1,500 nm. Accordingly, the heat shielding property is sufficiently high.

The transparent substrates with a laminated film in Ex. 4 to 10 have a high heat shielding property since the metal nitride contained in the functional layer has a high crystallinity.

Of the transparent substrate with a laminated film having no crystallinity-improving layer in Ex. 11, since the metal nitride contained in the functional layer has a low crystallinity, the laminated film has a high sheet resistance as compared with the laminated film having the same functional layer (CrN) in Ex. 3, and the functional layer has a low extinction coefficient at a wavelength of 1,500 nm. Accordingly, the heat shielding property is low.

Of the transparent substrates with a laminated film having no crystallinity-improving layer in Ex. 12 and 15, since the metal nitride contained in the functional layer has a low crystallinity, the laminated film has a high sheet resistance as compared with the laminated films having the same functional layer (TiN) in Ex. 1 and Ex. 2. Accordingly, the heat shielding property is low.

Of the transparent substrate with a laminated film having a high concentration of oxygen atoms at the boundary between the crystallinity-improving layer and the functional layer in Ex. 13, since the metal nitride contained in the functional layer has a low crystallinity, the laminated film

REFERENCE SYMBOLS

10: transparent substrate with a laminated film, 12: transparent substrate, 14: laminated film, 16: first laminated film, 18: second laminated film, 22: first dielectric layer, 24: crystallinity-improving layer, 26: functional layer, 28: second dielectric layer

The invention claimed is:

1. A transparent substrate with a laminated film, which comprises a transparent substrate and a laminated film formed on at least one surface of the transparent substrate, wherein:
   the laminated film has a first dielectric layer, a crystallinity-improving layer, a functional layer and a second dielectric layer in this order from the transparent substrate side;
   the crystallinity-improving layer contains $ZrN_x$, wherein x is higher than 1.2 and at most 2.0;
   the functional layer contains at least one metal nitride selected from the group consisting of titanium nitride, chromium nitride, niobium nitride, molybdenum nitride and hafnium nitride; and
   the concentration of oxygen atoms at a boundary between the crystallinity-improving layer and the functional layer is from 3.2 atom % to at most 20 atom %, wherein the boundary between the crystallinity-improving layer and the functional layer comprises atoms constituting the crystallinity-improving layer and atoms constituting the functional layer mixed with one another.

2. The transparent substrate with a laminated film according to claim 1, wherein the ratio of integrated intensity of a peak of the (111) plane to integrated intensity of a peak of the (200) plane in an X-ray diffraction pattern of the metal nitride contained in the functional layer is higher than 2.5.

3. The transparent substrate with a laminated film according to claim 1, wherein the functional layer has an extinction coefficient of higher than 2.8 at a wavelength of 1,500 nm.

4. The transparent substrate with a laminated film according to claim 1, wherein the first dielectric layer has a thickness of from 1.5 to 200 nm, the crystallinity-improving layer has a thickness of from 3 to 30 nm, the functional layer has a thickness of from 3 to 60 nm, and the second dielectric layer has a thickness of from 1.5 to 200 nm.

5. The transparent substrate with a laminated film according to claim 1, wherein the transparent substrate is a glass plate.

6. The transparent substrate with a laminated film according to claim 1, which has at least two laminated films on one surface of the transparent substrate.

7. The transparent substrate with a laminated film according to claim 1, wherein the first dielectric layer contains silicon nitride doped with aluminum.

8. The transparent substrate with a laminated film according to claim 1, wherein the functional layer contains either one or both of titanium nitride and chromium nitride.

9. The transparent substrate with a laminated film according to claim 1, wherein the ratio of the thickness of the functional layer to the thickness of the crystallinity-improving layer is from 5 to 10.

10. The transparent substrate with a laminated film according to claim 1, which has a top layer containing at least one compound selected from the group consisting of silicon dioxide, titanium nitride and carbon, on a surface of the laminated film.

11. A method for producing the transparent substrate with a laminated film as defined in claim 1, which forms the first dielectric layer, the crystallinity-improving layer, the functional layer and the second dielectric layer in this order on a surface of the transparent substrate.

12. The method for producing the transparent substrate with a laminated film according to claim 11, which forms the first dielectric layer, the crystallinity-improving layer, the functional layer and the second dielectric layer by a sputtering method.

13. The method for producing the transparent substrate with a laminated film according to claim 12, wherein after forming the layers by the sputtering method, heat treatment is carried out at from 400 to 700° C. for from 2 to 60 minutes.

14. A laminated glass comprising the transparent substrate with a laminated film as defined in claim 1.

15. A double glazing comprising the transparent substrate with a laminated film as defined in claim 1.

16. A window glass comprising the transparent substrate with a laminated film as defined in claim 1, wherein the transparent substrate is a single plate.

17. The transparent substrate with a laminated film according to claim 1, wherein the concentration of oxygen atoms at the boundary between the crystallinity-improving layer and the functional layer is at most 10 atom %.

\* \* \* \* \*